United States Patent
Rozanski et al.

(10) Patent No.: US 12,215,199 B2
(45) Date of Patent: Feb. 4, 2025

(54) POLYPROPYLENE BACKBONE, AND NANOPOROUS POLYPROPYLENE MEMBRANE

(71) Applicant: SABIC GLOBAL TECHNOLOGIES B.V., Bergen op Zoom (NL)

(72) Inventors: Artur Rozanski, Geleen (NL); Lidia Jasinska-Walc, Geleen (NL); Miloud Bouyahyi, Geleen (NL); Lanti Yang, Geleen (NL); Robbert Duchateau, Geleen (NL); Thomas Defize, Geleen (NL); Katrien Veerle Bernaerts, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 640 days.

(21) Appl. No.: 17/440,475

(22) PCT Filed: Mar. 12, 2020

(86) PCT No.: PCT/EP2020/056660
§ 371 (c)(1),
(2) Date: Sep. 17, 2021

(87) PCT Pub. No.: WO2020/200688
PCT Pub. Date: Oct. 8, 2020

(65) Prior Publication Data
US 2022/0169802 A1    Jun. 2, 2022

(30) Foreign Application Priority Data
Mar. 29, 2019 (EP) .................... 19166064

(51) Int. Cl.
*C08G 81/02* (2006.01)
*B01D 67/00* (2006.01)
(Continued)

(52) U.S. Cl.
CPC ....... *C08G 81/027* (2013.01); *B01D 67/0031* (2022.08); *B01D 71/261* (2022.08);
(Continued)

(58) Field of Classification Search
None
See application file for complete search history.

(56) References Cited

U.S. PATENT DOCUMENTS

| 5,618,599 A | 4/1997 | Nulman et al. |
| 2013/0041055 A1* | 2/2013 | Hillmyer ............. H01M 50/417 977/788 |

(Continued)

FOREIGN PATENT DOCUMENTS

| EP | 1186619 A2 | 3/2002 |
| WO | 9012054 A1 | 10/1990 |

(Continued)

OTHER PUBLICATIONS

Chung et al.; "Polypropylene-graft-Polycaprolactone: Synthesis and Applications in Polymer Blends"; Macromolecules, vol. 27, No. 6; 1994; pp. 1313-1319.

(Continued)

*Primary Examiner* — Anthony J Frost
(74) *Attorney, Agent, or Firm* — CANTOR COLBURN LLP

(57) ABSTRACT

The invention relates to a film Film comprising a random graft copolymer having a polypropylene (PP) backbone and from 3 to 8 polyester segments covalently bonded to said backbone, wherein the number average molecular weight (Mn) of the polypropylene backbone ranges between 10.000 and 100.000 Dalton (as determined with HT-SEC in o-DCB at 150° C.), wherein the Mn of each polyester segment ranges between 5.000 and 25.000 Daltons, wherein the amount of PP ranges between 45 and 80 mol %, wherein the (Continued)

Figure 1:
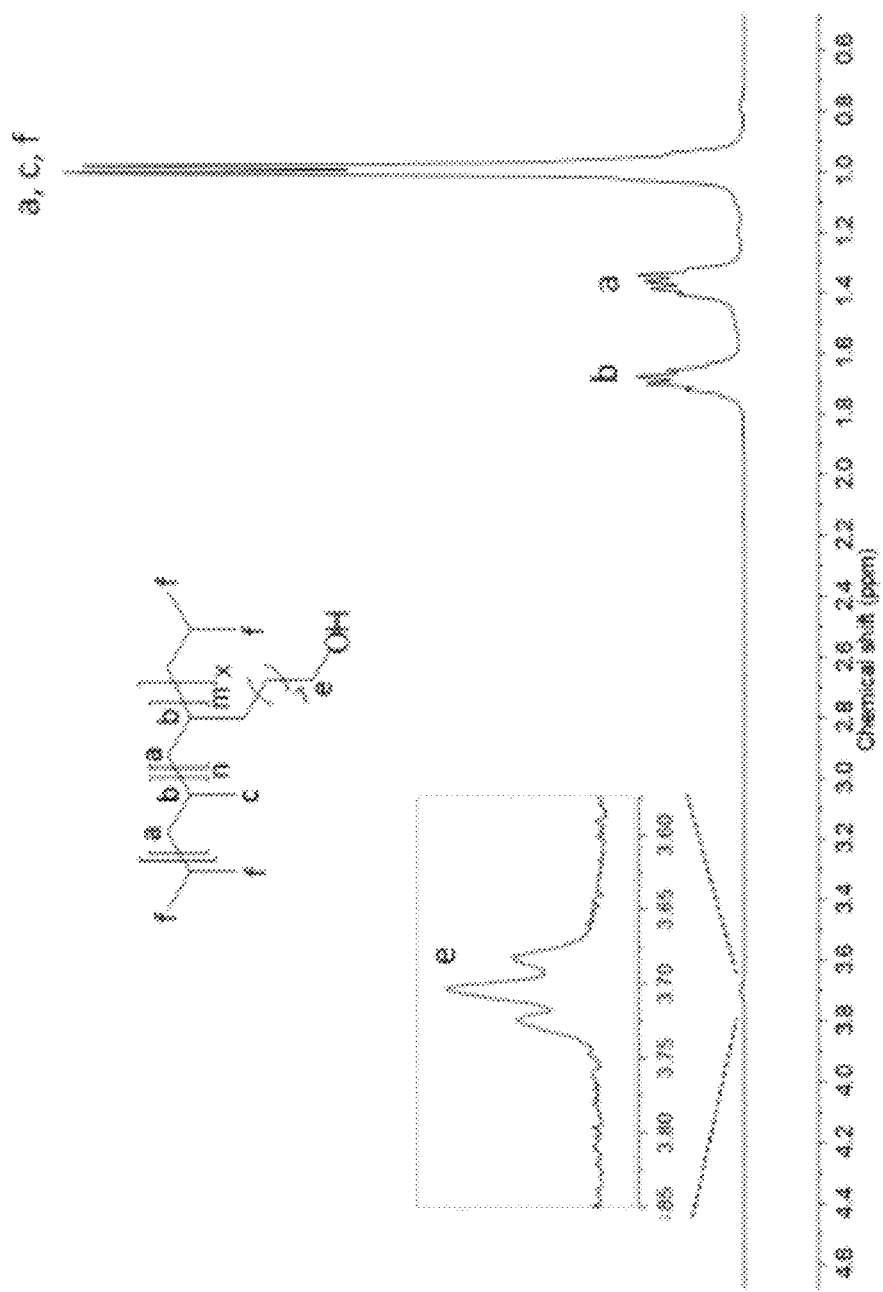

amount of polyester segments ranges between 55 and 20 mol %, wherein the film has a thickness in the range of 0.01-10 mm, wherein the polypropylene and polyester domains form independently continuous phases, and wherein the mol % is calculated relative to the total moles of monomer units present in the copolymer. The invention further relates to a nano porous PP membrane and its use.

16 Claims, 12 Drawing Sheets

(51) Int. Cl.
| | | |
|---|---|---|
| *B01D 71/26* | (2006.01) | |
| *B01D 71/48* | (2006.01) | |
| *B01D 71/78* | (2006.01) | |
| *C02F 1/44* | (2023.01) | |
| *H01M 50/414* | (2021.01) | |
| *H01M 50/417* | (2021.01) | |
| *H01M 50/449* | (2021.01) | |
| *H01M 50/489* | (2021.01) | |
| *H01M 50/491* | (2021.01) | |
| *H01M 50/406* | (2021.01) | |

(52) U.S. Cl.
CPC .......... *B01D 71/262* (2022.08); *B01D 71/48* (2013.01); *B01D 71/78* (2013.01); *C02F 1/442* (2013.01); *H01M 50/414* (2021.01); *H01M 50/417* (2021.01); *H01M 50/449* (2021.01); *H01M 50/489* (2021.01); *H01M 50/491* (2021.01); *B01D 2325/02833* (2022.08); *B01D 2325/04* (2013.01); *C08G 2340/00* (2013.01); *H01M 50/406* (2021.01)

(56) References Cited

U.S. PATENT DOCUMENTS

| | | | |
|---|---|---|---|
| 2015/0004391 A1* | 1/2015 | Nair | .......................... C08J 9/28 |
| | | | 521/84.1 |
| 2016/0376453 A1* | 12/2016 | Hearon | ................ C09D 11/102 |
| | | | 428/339 |
| 2017/0080628 A1* | 3/2017 | Topolkaraev | ........... B29C 51/42 |
| 2018/0163035 A1* | 6/2018 | Duchateau | ............ C08L 53/005 |
| 2019/0055337 A1* | 2/2019 | Mays | ........................ C08F 8/46 |

FOREIGN PATENT DOCUMENTS

| | | |
|---|---|---|
| WO | 2011112897 A1 | 9/2011 |
| WO | 2016097203 A1 | 6/2016 |
| WO | 2017097570 | 6/2017 |
| WO | 2017097571 | 6/2017 |

OTHER PUBLICATIONS

Bae et al., "Catalytic Hydroxylation of Polypropylenes," Journal of the American Chemical Society, Jan. 1, 20059, vol. 27(2), pp. 767-776.

International Search Report; International Application No. PCT/EP2020/056660; International Filing Date: Mar. 12, 2020; Date of Mailing: May 13, 2020; 15 pages.

Written Opinion; International Application No. PCT/EP2020/056660; International Filing Date: Mar. 12, 2020; Date of Mailing: May 13, 2020; 15 pages.

* cited by examiner

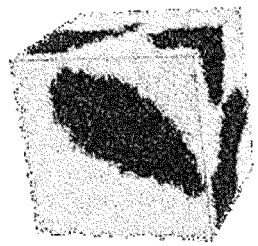

Figure 12a
Block copolymer
Polyester: 30 mol%; Mn: 23 000 Da
Polypropylene: 70 mol%; Mn: 50 000 Da

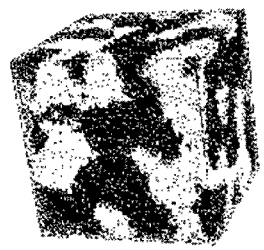

Figure 12b
Graft copolymer
Polyester: 47 mol%; Mn: 11 600 Da
Polypropylene: 53 mol%; Mn: 20 300 Da

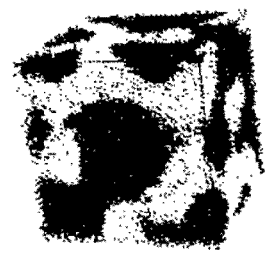

Figure 12c
Graft copolymer
Polyester: 48 mol%; Mn: 19 400 Da
Polypropylene: 52 mol%; Mn: 31 200 Da

Figure 12d
Graft copolymer
Polyester: 44 mol%; Mn: 8 800 Da
Polypropylene: 56 mol%; Mn: 21 800 Da

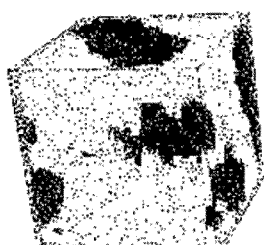

Figure 12e
Graft copolymer
Polyester: 13 mol%; Mn: 12 700 Da
Polypropylene: 87 mol%; Mn: 25 200 Da

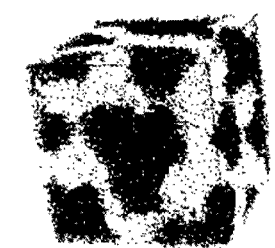

Figure 12f
Graft copolymer
Polyester: 48 mol%; Mn: 4 900 Da
Polypropylene: 52 mol%; Mn: 25 200 Da

POLYPROPYLENE BACKBONE, AND NANOPOROUS POLYPROPYLENE MEMBRANE

CROSS REFERENCE TO RELATED APPLICATIONS

This application is a National Stage application of PCT/EP2020/056660, filed Mar. 12, 2020. which claims the benefit of European Application No. 19166064.6, filed Mar. 29, 2019, both of which are incorporated by reference in their entirety herein.

The invention relates to a film comprising a graft copolymer having a polypropylene (PP) backbone and polyester grafts attached to the backbone, a nanoporous membrane from PP obtained from said film and its use.

Films comprising a polyolefin coupled to a polyester are known in the art. Also, nanoporous membranes of polyolefins are known in the art.

Membrane technology becomes increasingly important as separation technique for a wide variety of applications. Water purification and industrial separation processes are good examples of that. Both non-porous reversed osmosis membranes (i.e. water desalination, gas separation) and porous micro-/ultra-/nanofiltration membranes are used. Polyvinylidene difluoride, poly(ethylene-co-chlorotrifluoroethylene), polysulfone, polyethersulfone, polyphenylsulfone and aromatic polyamides are the most common materials used to produce the membranes.[1] Although these specialty polymers reveal excellent mechanical properties, with an average price of $10-$20/kg the raw materials are expensive. Furthermore, recycling or incineration of e.g. polyvinylidene difluoride or polysulfone is not without risk of pollution and release of toxic components.

Currently, most of the membranes for micro-, ultra- and nanofiltration are prepared by controlled crazing, e.g. Celgard® microporous membranes,[2] track etching, e.g. Whatman® Nuclepore™,[3] template leaching,[4] or by using phase separation methods of block copolymers.[5],[6]

Crazing is the initial fracture process which leads to the development certain fracture morphologies. Crazing develops when excessive tensile stress is applied to a polymer, leading to micro void formation in a plane normal to the stress.

Block copolymers receive increasing attention as precursors in membrane technology due to their potential to form membranes with tuneable pore size and narrow pore size distributions, high flux, high selectivity, the ability for selective functionalisation and good mechanical properties. The two main strategies for pore generation in block copolymer-based membranes are (1) the abovementioned self-assembly and phase separation and (2) film casting and selective block sacrifice.[5],[6]

Polyolefin-Based Nanoporous Membranes.

Due to the rather poor solubility of polyolefins in environmentally friendly solvents, the phase separation methods like SNIPS that requires solvent casting is not applicable for most polyolefin-based block copolymers.[5] Track etching, a rather expensive technique used to produce nanoporous polycarbonate and polyethylene terephthalate membranes,[3] is hardly applied for polyolefins either. Most commonly, polyolefin-derived micro- and nanoporous (>100 nm) membranes are fabricated by controlled crazing.[2] While this preparation technology is well established, the relatively large pore size and the non-uniform pore size distribution of the membranes limit their applications. Alternatively, template leaching has been developed where mixtures of polyolefins and solvents, oils or other polymers are allowed to undergo thermally induced phase separation (TIPS) after which the solvent, oil or polymer is removed by extraction to produce microporous polyolefin-based membranes.[4]

Selective Segment Sacrifice Process.

A resembling strategy has been applied to produce nanoporous membranes, starting from amphiphilic block copolymers. The phase separation-induced morphology of such a block copolymer can be stirred by altering the volume fraction of each of the components forming the block copolymer. When a cylindrical or gyroid bicontinuous morphology (also name bicontinuous phases) is formed, the degradable segments (e.g. polyester, polybutadiene or polysiloxane) can selectively be removed by etching, leaving a nanoporous polymeric material behind. This selective segment sacrifice techniques has initially been reported for the production of polystyrene-based nanoporous membranes,[6] but has recently also been applied to produce polyethylene-based nanoporous membranes.[7] Hillmyer and coworkers prepared PE-based block copolymers starting from hydroxyl-functionalised hydrogenated polybutadiene as macroinitiator to produce the corresponding PE-PLA block copolymers by catalytic ring-opening polymerisation.[7b-c] The bottleneck of this approach is the cumbersome and expensive 3-step synthetic approach to produce the OH-functionalised PE's comprising Ring-Opening Metathesis Polymerisation (ROMP) of cyclooctene followed by air oxidation and finally a hydrogenation step. Furthermore, it is limited to the production of PE-based membranes, which limits the thermal stability and for example cannot be sterilised. Coordinative chain transfer polymerisation followed by in situ air oxidation provides a considerably simpler and cheaper synthetic approach to achieve chain-end functionalised polyolefins.[7a,e] However, this process has to be performed in solution at high temperature, otherwise only low molecular weight (<5 kDa) products are obtained as the chain transfer process becomes ineffective as soon as the polymers start to crystallise from solution. Furthermore, the effectiveness of the post-polymerisation functionalisation step is limited to approximately 80%. Hence, the formation of chain-end functionalised polyolefin macroinitiators—precursors for the corresponding block copolymers—is limited to PE-like products produced in a three-step process, or to products with max 80% functionality in a two-step process.

WO2011112897A1 describes nanoporous linear polyolefin membranes and block copolymer precursors for the same. The patent application mentions that polyolefins can be polyethylene (PE) or PP, but only shows examples of linear PE as polyolefin blocks. The linear PE blocks have been derived from end capped hydrogenated polybutadiene polymer chains, which have subsequently been copolymerised with cyclic esters to prepare the polyester-polyolefin-polyester copolymers. The patent application does not explain how a triblock copolymer can be prepare from PP, which cannot be derived from polybutadiene.

Problems of the PE-based nanoporous membranes is the low operation temperatures, inability to be sterilised, limited throughput and fouling of the membranes, such that flux through the nanoporous membranes is limited.

So far, no semi-crystalline polyolefin membranes other than those based on PE have been reported. One of the major disadvantages of PE or atactic polyvinyl cyclohexane-based membranes is that they cannot be sterilised due to their low melting point and glass transition point ($T_g$), respectively.[9] Changing to high melting polyolefins like isotactic or syndiotactic polypropylene, poly(4-methyl-1-pentene), polyvinyl cyclohexane, poly(3-methyl-1-butene), retortable membranes could be obtained.

There are various advantages of using polyolefin-based graft copolymers for the production of nanoporous membranes: The production of the randomly functionalised polyolefin macroinitiators is a one-step process and can produce functionalised polyolefins with a wide variety of chemical structures, melting points and molecular weights.

Typically, PE-polyester block copolymers are produced by ring-opening polymerisation of lactones using the hydroxyl chain-end functionalised PE. Albeit an effective method on lab scale, this process—which requires dissolution of the PE macroinitiator—is difficult and expensive to scale up.

It is an object of the present invention to overcome at least some of these and other disadvantages.

The invention relates to a film comprising
a random graft copolymer having a polypropylene (PP) backbone and from maximum of 3 to 8 polyester segments (also called grafts) covalently bonded to said backbone when all functional group have been reacted,
wherein the number average molecular weight ($M_n$) of the PP backbone ranges between 10 and 100 kDa (as determined with HT-SEC in o-DCB at 150° C.), preferably 20 and 100 kDa,
wherein the $M_n$ of each polyester segment ranges between 5 and 25 kDa (as determined by $^1$H NMR in tetrachloroethane-$d_2$ at 90° C.),
wherein the amount of PP in the backbone ranges between 45 and 80 mol %,
wherein the amount of polyester in the polyester segments ranges between 55 and 20 mol %,
wherein the film has a thickness in the range of 0.01-10 mm,
wherein the PP and polyester domains form bicontinuous phases,
wherein the mol % is calculated relative to the total moles of monomer units propylene and ester present in the copolymer.

The invention also relates to a nanoporous membrane comprising at least 90 wt % of PP, wherein the PP has between 3 and 8 —OX groups per polymer chain, wherein the membrane has a pore having a size between 20-50 nm (as measured with $N_2$-adsorption according to Barret-Joyner-Halenda model), a surface area between 50-200 $m^2/g$, and wherein X for each —OX is chosen from H, Li, Na and K.

The membrane according to the invention can be used at high temperature, such that it is possible to sterilise the membrane. Surprisingly, the membrane has a high flux of aqueous media, such that the throughput is exceptionally high. Further, it has been found that the size of the nanopores can be tuned by choosing the right combination of PP and polyester, which enlarges the design freedom and fields of use of the membranes.

It was found that the type of polyester—used as sacrificial segments in the corresponding graft copolymers—has a significant effect on the pore size. Changing for example polyvalerolactone with polycaprolactone, while keeping the molar fractions the same, resulted in a drop in pore size of 50%.

Bicontinuous phases or bicontinuous gyroid morphology is a known crystallographic phase. For polymers, it is between the lamellar and cylindrical phases.

In others words, following feature: a random graft copolymer having a PP backbone and a maximum from 3 to 8 polyester grafts covalently bonded to said backbone when all functional group reacted, wherein the PP and polyester domains form bicontinuous phases, can be also describe as follow "a random graft copolymer having a PP backbone and between 3 to 8 polyester grafts, the graft copolymer being in the form of a nano-structured, bicontinuous gyroid morphology comprising two interpenetrating continuous phases, wherein one continuous phase comprises the PP part of the graft copolymer and the second continuous phase comprises the polyester part of the graft copolymer".

However, it is possible that not all the functional groups react, and therefore the number of polyester graft can be between 1 to 8.

This multi-graft copolymer can have more than two functionalities per chain compare to triblock copolymers described in the prior art WO2011/112897. The presence of graft segment allows higher reactivity due to pending sterically unhindered OH group than having OH group at the end of the PP chain.

DETAILED DESCRIPTION

The invention relates to a film comprising
a random graft co-polymer having a polypropylene (PP) backbone and from 3-8 polyester grafts or (also called segments) covalently bonded to said backbone,
wherein the number average molecular weight ($M_n$) of the PP backbone ranges between 10 and 100 kDa (as determined with HT-SEC in o-DCB at 150° C.), preferably 20 and 100 kDa.
wherein the $M_n$ of each polyester segment ranges between 5 and 25 kDa (as determined by $^1$H NMR in tetrachloroethane-$d_2$ at 90° C.),
wherein the amount of PP in the backbone ranges between 45 and 80 mol %,
wherein the amount of polyester in the polyester segments ranges between 55 and 20 mol %,
wherein the film has a thickness in the range of 0.01-10 mm,
wherein the PP and polyester domains form bicontinuous phases,
wherein the mol % is calculated relative to the total moles of monomer units propylene and ester present in the copolymer.

SEC-DV stands for Size Exclusion Chromatography-differential viscometer. The measurements have been performed in ortho-dichlorobenzene (o-DCB). The SEC instrument is equipped with an infrared detector and online viscometer. A Mark Houwink plot shows changes in size (viscosity) as a function of molar mass, which is normally linear for samples without long-chain branches (LOB) and it deviate if there are LOB.

The $M_n$ in kDa was determined using a standard High Temperature Size Exclusion Chromatography (HT-SEC) method as described below:

Measurements were performed at 150° C. on a Polymer Char GPC-IR® built around an Agilent GC oven model 7890, equipped with an autosampler and the Integrated Detector IR4. 1,2-Dichlorobenzene (o-DCB) was used as an eluent at a flow rate of 1 mL/min. The data were processed using Calculations Software GPC One®. The molecular weights were calculated with respect to polystyrene standards.

The film comprises a random graft copolymer having a PP backbone and polyester side chains, covalently coupled to the backbone.

The PP backbone comprises functional groups, it is preferably prepared from a PP homopolymer or from a copolymer of propylene and ethylene, wherein the amount of ethylene is less than 5 wt %.

The hydroxyl-functionalised PP in the backbone of the copolymer has preferably a melting temperature of at least 120° C., preferably at least 130° C., more preferably at least 135° C. or between 140-160° C. The PP is preferably isotactic or syndiotactic, most preferably isotactic. Such high melting point allows the membrane according to the invention to be sterilized, in particular by steam sterilization around 120° C., without losing its mechanical properties.

The film has good mechanical properties. The Young's modulus typically lies between 300 and 1500 MPa, preferably between 350 and 1200 MPa or between 400 and 1000 MPa. The toughness of the film typically ranges between 1 and 150 J/m$^3$, preferably between 2-120 J/m$^3$, more preferably between 4 and 100 J/m$^3$.

The PP is coupled to the polyester segments through ester linkages, whereby the original PP contains OH groups. The OH groups are preferably part of short side chains of the PP backbone. The short side chains are preferably obtained by copolymerisation of propylene with an α-olefin having an OH group. The OH groups are preferably randomly distributed along the PP polymer chain. Copolymers having randomly distributed OH groups are known in the art.

WO2017097570A1 and WO2017097571A1 disclose copolymers of ethylene with side chains containing OH groups.

EP1186619 (Mitsui Chemicals Inc.) discloses olefin copolymers having polar groups. WO2016097203 describes a number of examples of PP polymers having OH side chains, wherein the OH groups are coupled to polycaprolactone.

The number of OX groups, preferentially OH groups present in the PP (before preparing the graft copolymer) ranges (on average) between 3 to 8 OH groups per molecule. This can be determined by $^1$H NMR in tetrachloroethane-d$_2$ at 90° C.

The molecular weight of the PP backbone preferably ranges between 10 and 100 kDa (as determined with HT-SEC in o-DCB at 150° C.), more preferably 20 and 100 kDa.

When all OX groups have reacted, the graft copolymer contains between 3 and 8 polyester chains per molecule, which have been coupled to the OX groups of the original PP, as determined by $^1$H NMR tetrachloroethane-d$_2$ at 90° C.

Therefore, due to the high number of OX groups present in the PP, it allows to create multi-graft copolymer comprising between 4 to 9 segments (1 PP segment and 3 to 8 polyester segments), when all OX groups reacted.

However, it is possible that not all the functional groups react, and therefore the number of polyester graft can be between 1 to 8 polyester chains per molecule.

The coupling to produce the PP-graft-polyester copolymer can be done by transesterification of at least one second polymer comprising at least one carboxylic or carbonic acid ester functionality (for example a polyester), and/or by ring-opening polymerisation (ROP) of cyclic esters, like for example caprolactone, valerolactone, p-propiolactone, p-butyrolactone, 3-methyloxetan-2-one, E-decalactone, 5,5-dimethyl-dihydro-furan-2-one, 1,4-dioxepan-5-one, 1,5-dioxepan-2-one, 3,6-dimethylmorpholine-2,5-dione, 1,4-dioxepan-7-one, 4-methyl-1,4-dioxepan-7-one, (S)-g-hydroxymethyl-g-butyrolactone, g-octanoic lactone, g-nonanoic lactone, 5-valerolactone, 5-hexalactone, 5-decalactone, 5-undecalactone, 5-dodecalactone, glycolide, lactide (L, D, meso), heptalactone, octalactone, nonalactone, decalactone, 11-undecalactone, 12-dodecalactone, 13-tridecalactone, 14-tetradecalactone, 15-pentadecalactone (or pentadecalactone), globalide, 16-hexadecalactone, ambrettolide, 17-heptadecalactone, 18-octadecalactone, 19-nonadecalactone, ethylene brassylate, butylene brassylate, cyclic butyl terephthalate, cyclic butyl adipate, cyclic butyl succinate, cyclic butyl terephthalate oligomers.

The cyclic esters, in particular where these are lactones, may be in any isomeric form and may further contain organic substituents on the ring that do not prevent the ROP. Examples of such cyclic esters include 4-methyl caprolactone, E-decalactone, the lactone of ricinoleic acid or the hydrogenated version of thereof, 13-hexyloxacyclotridecan-2-one, and the like.

It is further possible that the cyclic ester comprise one or more unsaturations in the ring. Examples of such cyclic esters include 5-tetradecen-14-olide, 11-pentadecen-15-olide, 12-pentadecen-15-olide (also known as globalide), 7-hexadecen-16-olide (also known as ambrettolide) and 9-hexadecen-16-olide.

The cyclic ester may further have one or more heteroatoms in the ring, provided that such do not prevent the ROP. Examples of such cyclic esters include 1,4-dioxepan-5-one, 1,5-dioxepan-2-one, 3,6-dimethylmorpholine-2,5-dione, 1,4-oxazepan-7-one, 4-methyl-1,4-oxazepan-7-one, 10-oxahexadecanolide, 11-oxahexadecanolide, 12-oxahexadecanolide and 12-oxahexadecen-16-olide.

Preferably, the cyclic esters are chosen from caprolactone and from valerolactone.

The polarity of the polyester segment may be tuned e.g. by adding a combination of multiple cyclic monomers of different polarity, by tuning of the polarity of the second polymer segment during the pre-synthesis by using combinations of monomers before attaching it to the polyolefin segment via nucleophilic substitution, by adding a combination of multiple second polymers of different polarity, or by adding a combination of cyclic monomers and a second polymer by nucleophilic substitution. The melting temperature and/or glass transition temperature of the resulting grafts of the graft copolymer may also be tuned while conserving the crystalline properties by selecting suitable monomers for the second segment. In other words, both the physical and mechanical properties may be tuned using the present invention. In addition, the hydrolysis and degradation properties of the polar polymer segment may be tuned while not affecting the polyolefin segment.

The $M_n$ of each polyester segment ranges between 5 and 25 kDa (as determined with $^1$H NMR in tetrachloroethane-d$_2$ at 90° C.).

The polyester segments (e.g., polycaprolactone or polyvalerolactone segments) are incompatible with the linear PP backbone. The incompatibility results in phase separation at some point after the graft copolymer synthesis from the initial homogeneous state, and creating a multi-phase composition having a nano-structured, bicontinuous microstructure in which one of the phases includes the polyester segments.

Depending on the PP/polyester composition, the copolymer forms a bicontinuous phase, which means that the PP forms a continuous phase and the polyester also forms a continuous phase. The presence of a bicontinuous phase can be visualised with different techniques like for example transmission electron spectroscopy (TEM), scanning electron microscopy (SEM), atomic force microscopy (AFM) and/or small angle X-ray scattering (SAXS).

The amount of polyester within the limits of the film according to the invention is about 5 to 90 mol % (mol % is calculated relative to the amount of molar units present in the copolymer.

However, in order to have a film usable as a porous membrane according to the invention, the amount of PP ranges between 45-80 mol %, while the amount of polyester segments is also between 55-20 mol %. Preferably, the amount of PP ranges between 50-75 mol %, while the amount of polyester segments is between 50-25 mol % (mol % is calculated relative to the amount of molar units present in the copolymer). If this amount is not reached the film becomes a barrier and cannot act as a porous membrane as there is not a pathway within.

FIGS. 12a, b, c, d, e, f illustrate the self-organisation and the morphology of the graft copolymer depending the number average molecular weight of polyester and polypropylene.

FIG. 12a represents a comparative example with not a graft copolymer but a block copolymer with the number average molecular weight of polyester and PP segments within the range of the invention. It can easily be seen that the self-organisation and the morphology of the block copolymer does not allow the formation of nano-pores, gyroid bicontinuous phase, when the polyester phase is removed.

FIGS. 12b, c and d illustrate embodiments within the scoop of the invention in which the graft copolymers have the number average molecular weight and the amount of polyester and PP within the range of the invention.

It can easily be seen that the self-organisation and the morphology of the graft copolymers allows the creation of channel when the sacrificial segments will be removed.

FIGS. 12e and 12f illustrate comparative embodiments outside the scoop of the invention in which the graft copolymer have the number average molecular weight and/or the amount of polyester and PP outside the range of the invention.

The comparative embodiment in FIG. 12e comprises less than 20 mol % of polyester (mol % is calculated relative to the amount of molar units present in the copolymer), the self-organisation and the morphology of the graft copolymer is not bicontinuous and cannot form a porous membrane after selecting segment sacrifice process.

The comparative embodiment in FIG. 12f, comprises polyester segments with number average molecular weight of each polyester segment ranges less than 5 kDa. The self-organisation and the morphology of the graft copolymer does not lead to a bicontinuous gyroid morphology.

The film of the graft copolymer can be transformed into a membrane having nanopores, by selectively dissolving or sacrificing the polyester (so called segment sacrifice process), while keeping the PP phase intact.

The polyester segments may be selectively removable, e.g., by chemically etching using base or acid. Removal creates a plurality of nano-sized pores. The pores are small (e.g., pore diameters on the order of 1 to 500 nanometers, or 5 to 100 nanometers, preferably between 10 and 50 nm). In addition, the pores are characterised by a relatively narrow size distribution, and are substantially homogeneously distributed throughout the film. These features make the nanoporous film particularly useful for applications such as separation membranes (e.g., battery separators). In general, the films are useful in a variety of applications, including separation membranes (e.g., battery separators), membranes for water purification, fuel cell membranes, catalytic reactors, nano-templates, and the like. The nanoscopic, bicontinuous structure that results from the aforementioned process contains interpenetrating domains that both percolate through the entire material. This bicontinuity allows for one mechanically robust phase to support the entire structure and another percolating domain that endows the material with some specific functionality. Generating a nanoporous structure by removal of the functional domain (polyester segment) gives a material with a percolating pore structure. Since the pore size distribution is narrow and the pore structure permeates the entire film, such membrane materials are useful as battery separators and separation membranes.

The invention therefore also relates to a nanoporous membrane. The nanoporous membrane comprises at least 90 wt % of PP, preferably at least 95 or at least 98 wt % of PP. The PP comprises —OX functional groups randomly distributed on the polymer chain. The amount of functional groups ranges between 3 and 8 per polymer chain (on average), as determined with $^1$H NMR in tetrachloroethane-$d_2$ at 90° C. For every —OX, X can be H, Li, Na or K, which makes the —OX group an —OH group, an —OLi, —ONa or —OK group, respectively. In another embodiment, X can also be Mg, Zn and Al.

The PP in the membrane preferably has a $M_n$ between 10-100 kDa, more preferably 20 and 100 kDa, as determined with HT-SEC (o-DCB at 150° C.). The PP is preferably a homopolymer of propylene, or a copolymer of ethylene and propylene, wherein the amount of ethylene is less than 5 wt %.

Preferably, the PP is isotactic or syndiotactic, more preferably isotactic.

The membrane can have a thickness between 0.01 and 10 mm.

The membrane preferably has pores having a size between 1-500 nm, preferably between 5-100 nm, more preferably between 10-50 nm (as measured with $N_2$-desorption according to Barret-Joyner-Halenda model) and a BET surface area between 50-200 m$^2$/g (determined by the Brunauer-Emmet-Teller method).

The membrane has preferred mechanical and thermal properties.

The membrane has a high heat stability and can be sterilised. The melt temperature ($T_m$) of the membrane ranges between 120° C. and 160° C., preferably between 130 and 159° C., more preferably between 140 and 158° C. The $T_m$ is measured with DSC ($2^{nd}$ heating curve, heating of 10 K/min).

The membrane has a Young's modulus between 50 and 400 MPa, preferably between 100 and 300 MPa. The membrane has a toughness between 0.1 and 15 J/m$^3$, preferably between 0.5 and 10 J/m$^3$.

It has surprisingly be found that the type of polyester segment influences the microstructure of the film, and thereby also the nanopore structure of the membrane, after sacrificing the polyester segment. For example, when valerolactone is used as monomer for the polyester segment, larger pores can be obtained compared to the use of caprolactone as monomer.

It is believed that the presence of the OX-groups in the PP membrane leads to a membrane that has a unique structure, that has the advantage to give a membrane having good mechanic properties and also good flux properties: it is found that the flux of water or aqueous solutions through the membrane is higher compared to other membranes having similar pore sizes. This means that the amount of aqueous solution passing through a membrane having a defined surface and thickness, is high at a given pressure difference over the membrane.

The invention also relates to the use of the film according to the invention for the manufacture of a membrane suitable to be used as a water filter or battery separator.

The invention relates to a water filter system comprising the nanoporous membrane according to the present invention.

The invention also relates to a battery comprising the nanoporous membrane according to the present invention.

The invention also relates to a method for making the film as defined in the present invention.

The method comprises the steps of
a) providing a hydroxy functionalised PP with 3 to 8 hydroxy groups,
b) preparation of a graft copolymer by either
   a. ring-opening polymerisation (ROP) of a cyclic ester or
   b. transesterification of a polyester using a suitable transesterification catalyst,
c) and formation of a film by
   a. extruding the copolymer at a temperature of at least 180° C. to make a gyroid bicontinuous morphology film through a film extrusion die or
   b. making a film through compression molding.

The invention also relates to an PP membrane unit, which can be a multilayer membrane or multi membranes, in which the layers or the membranes comprises
1. the nanoporous membrane as defined above,
2. a microporous PP membrane and/or a PP non-woven material.

The invention also relates to a polypropylene based membrane, which membrane comprises the nanoporous membrane following the invention as defined above and a microporous polypropylene membrane and/or a polypropylene non-woven material.

The invention also relates to the use of the nanoporous membrane for making an all PP-membrane to be used in for example a battery, a water filter or other application. Some advantages of the all-PP membrane, is that they can be used at high temperatures, can be sterilised and can have a high flux for efficient separation of components in for example aqueous media. They can further be easily recycled and be part of a circular economy.

FIGURES

FIG. 1: $^1$H NMR spectrum of the isotactic-poly(propylene-co-undecenol) precursor used for the synthesis of iPP-g-PVL and iPP-g-PVL copolymers with the methylene proton signal connected to the pending OH groups magnified for clarity, measured in tetrachloroethane-$d_2$ at 90° C.

Figure 2:
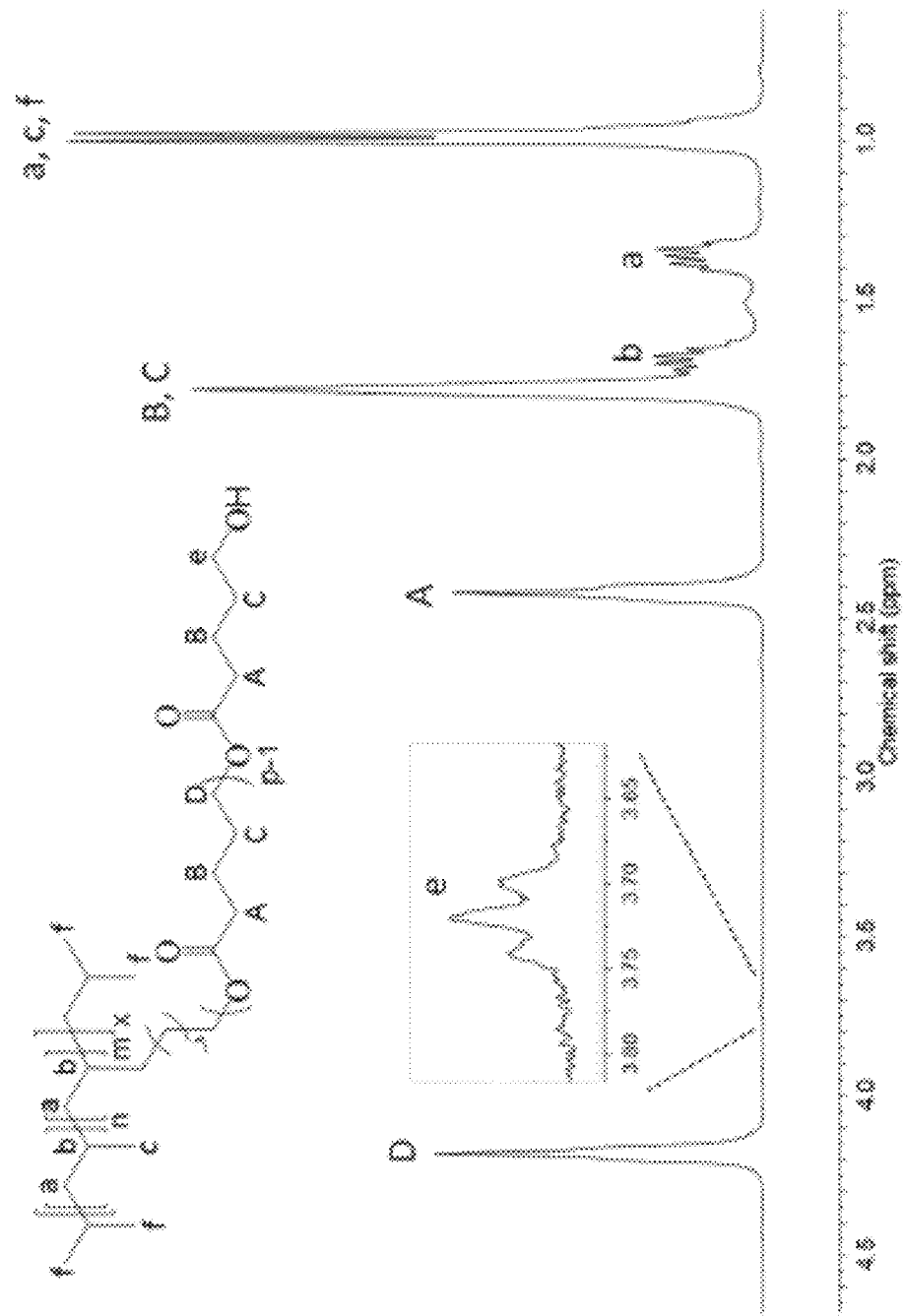

FIG. 2: $^1$H NMR spectrum of the iPP-g-PVL copolymer (iPP$_{53\ mol\ \%}$-g-PVL$_{47\ mol\ \%}$) with the methylene proton signal connected to the pending OH groups magnified for clarity, measured in tetrachloroethane-$d_2$ at 90° C.

Figure 3:
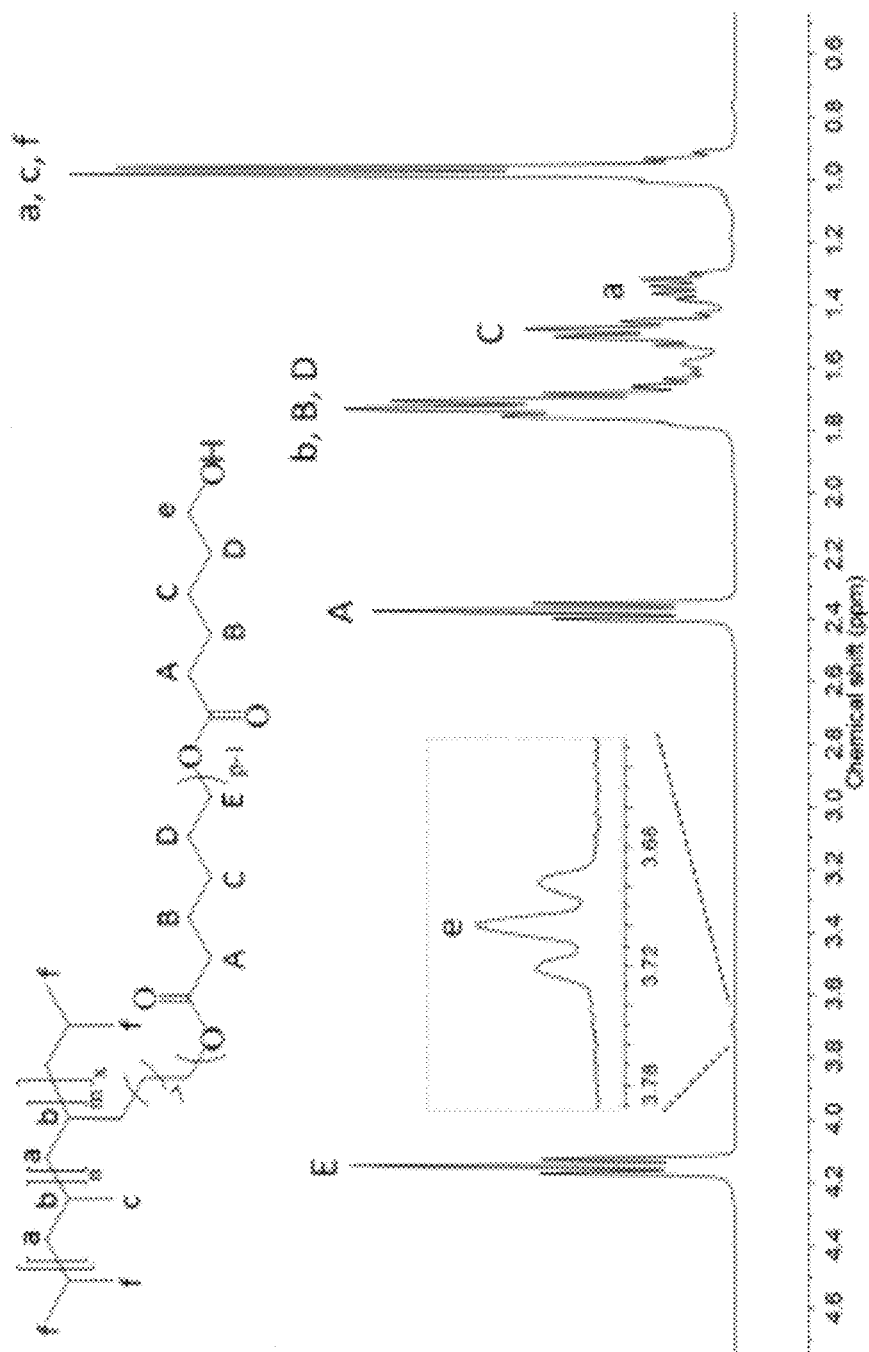

FIG. 3: $^1$H NMR spectrum of the iPP-g-PCL copolymer (iPP$_{53\ mol\ \%}$-g-PCL$_{47\ mol\ \%}$) with the methylene proton signal connected to the pending OH groups magnified for clarity, measured in tetrachloroethane-$d_2$ at 90° C.

Figure 4:
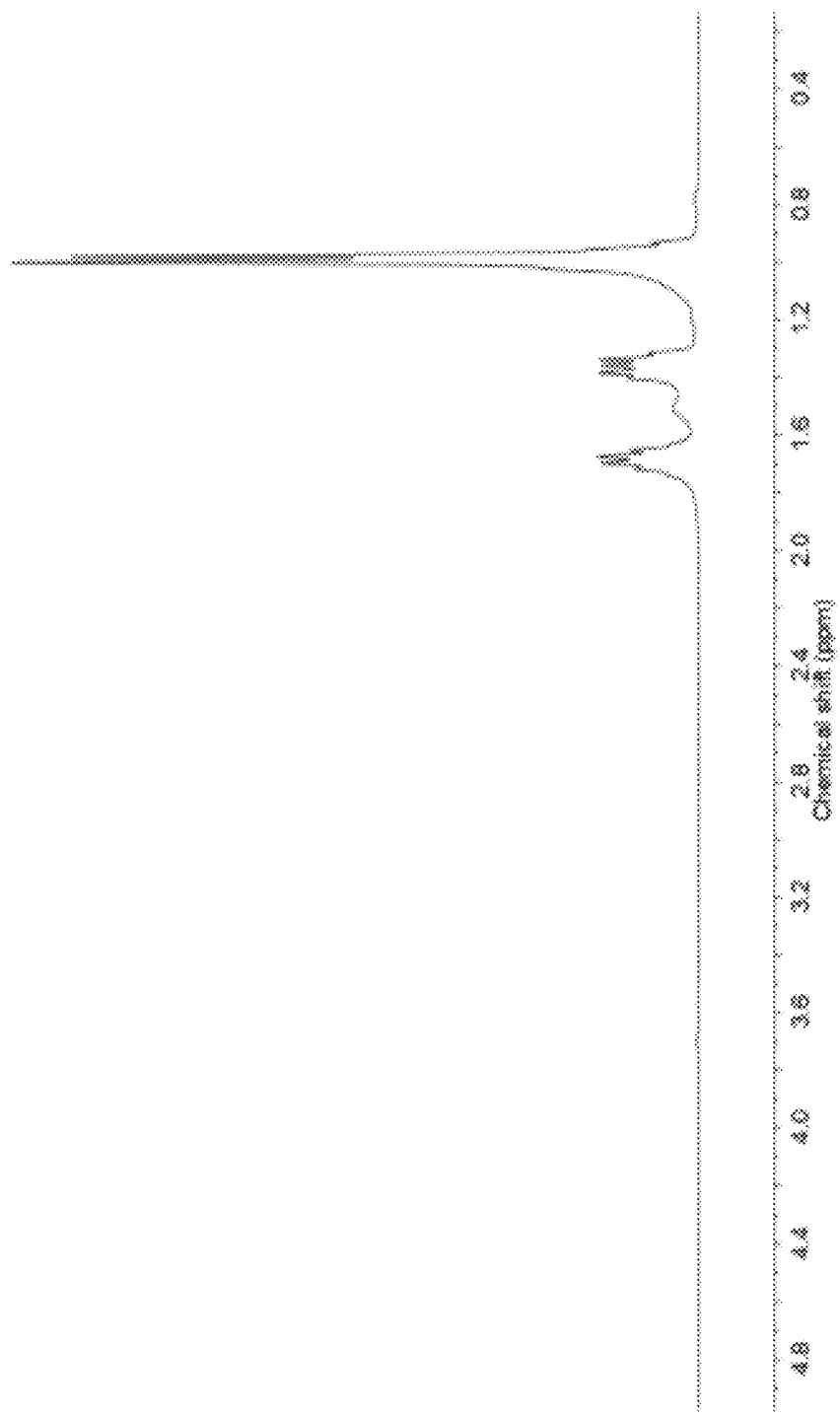

FIG. 4: $^1$H NMR spectrum of the iPP-g-PVL after degradation of the PVL chains, measured in tetrachloroethane-$d_2$ at 90° C.

Figure 5:
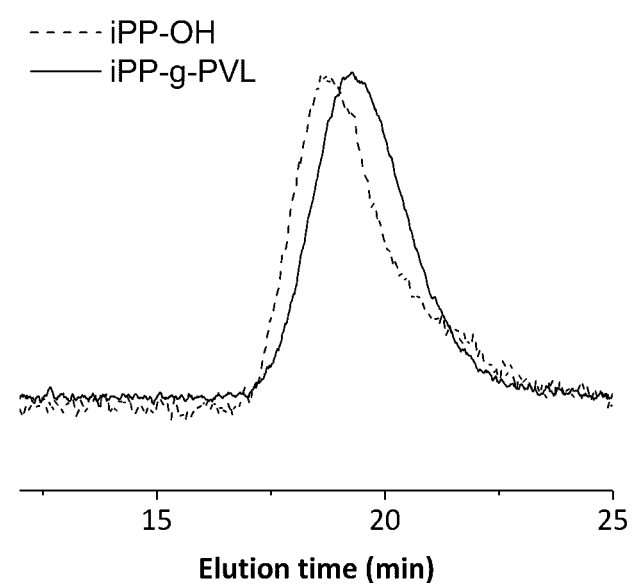
Figure 6A:
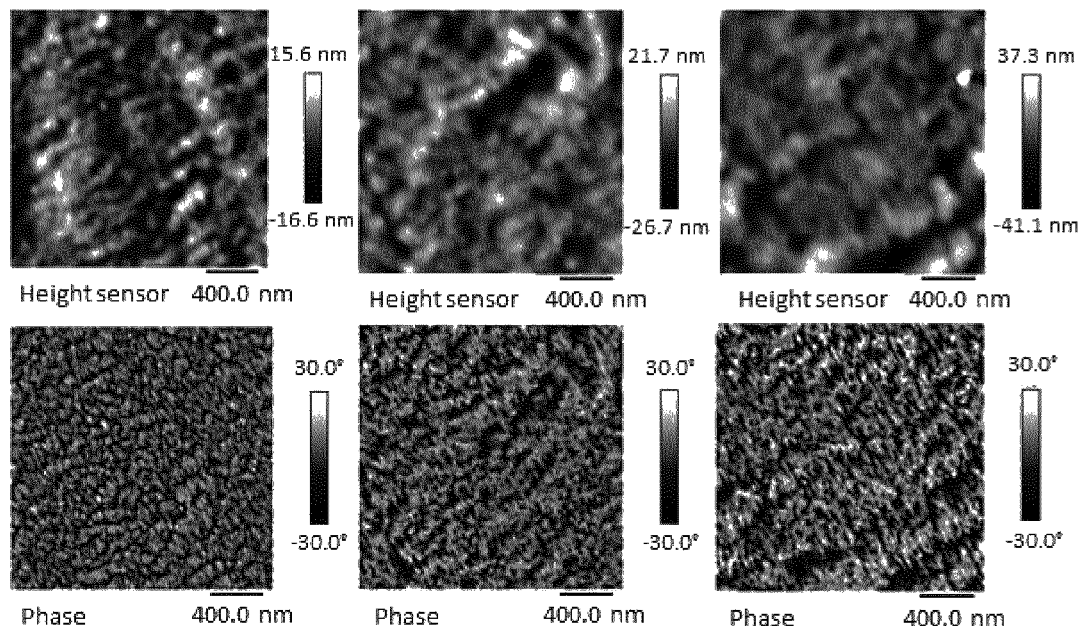
Figure 6B:
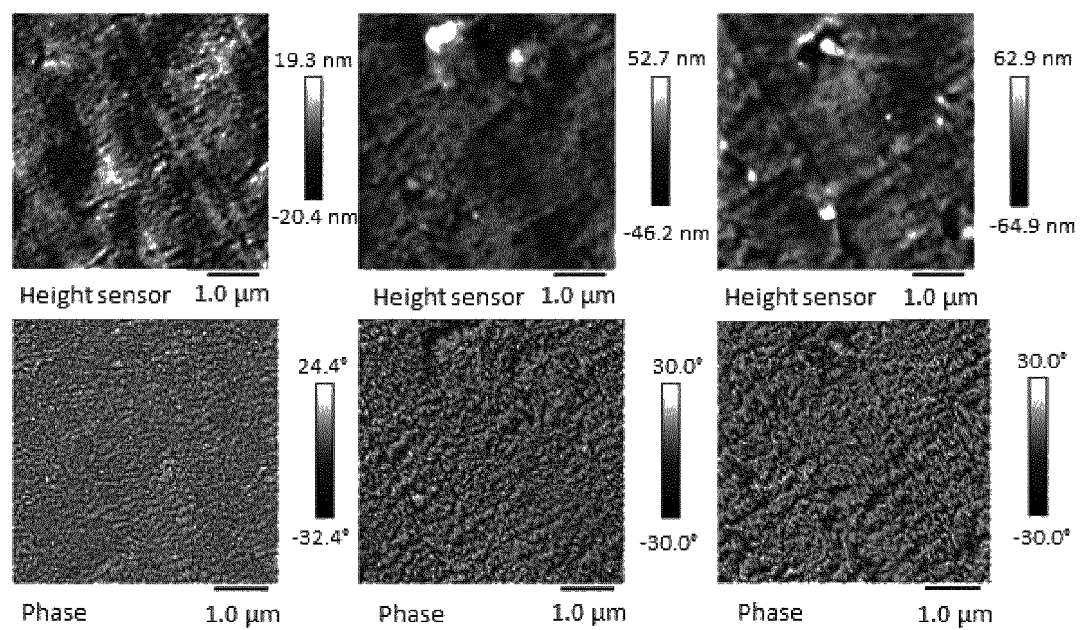
Figure 6C:
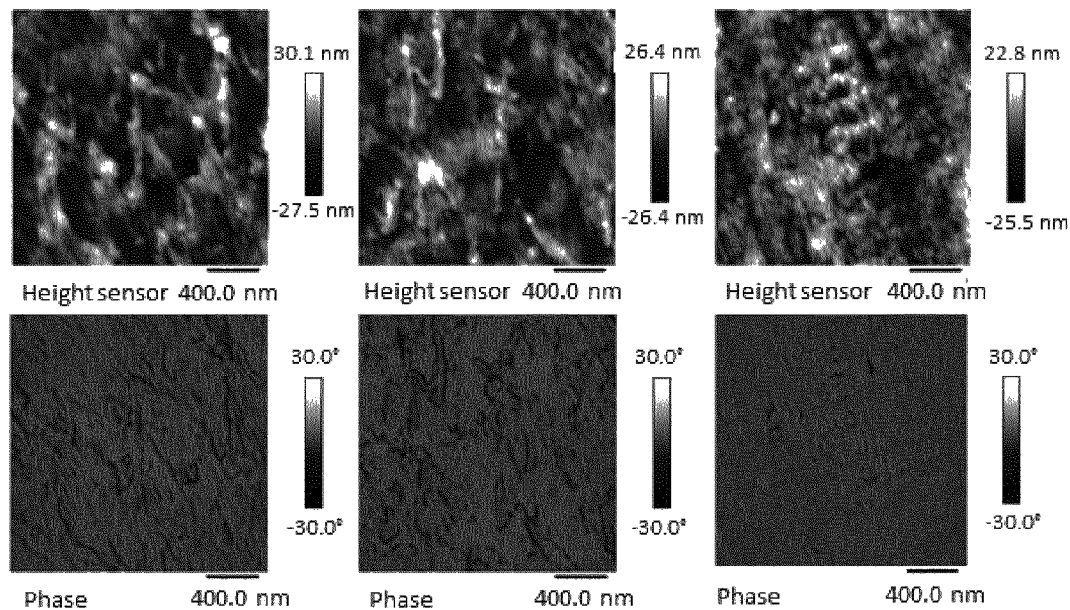
Figure 6D:
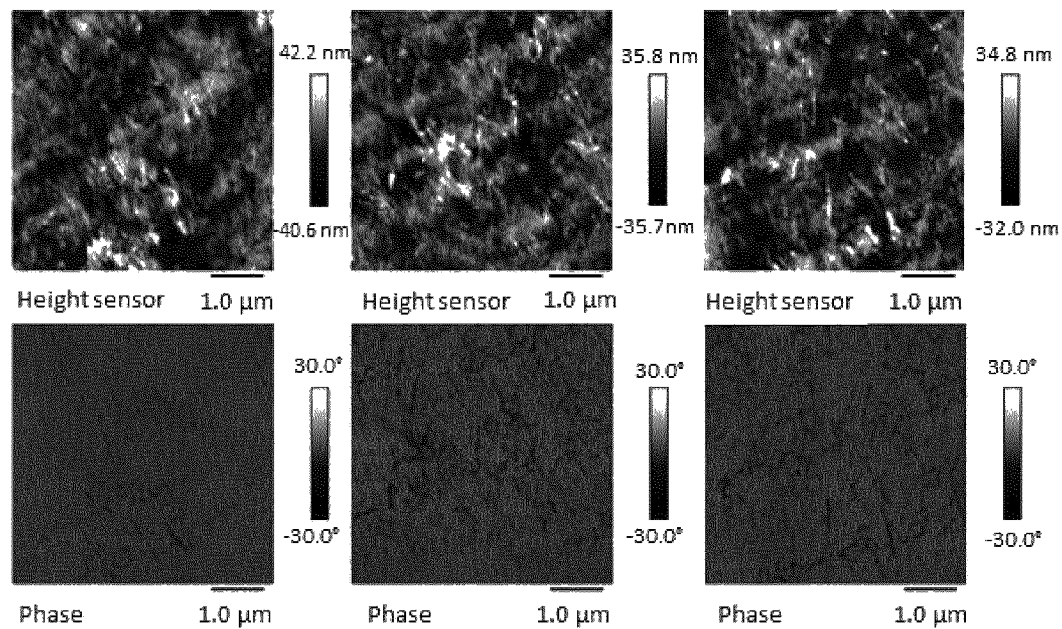

FIG. 5: SEC traces of isotactic-poly(propylene-co-undecenol) precursor and iPP-g-PVL copolymer (iPP$_{53\ mol\ \%}$-g-PVL$_{47\ mol\ \%}$).

FIG. 6: AFM of the cross-section of iPP-g-PVL copolymer (iPP$_{53\ mol\ \%}$-g-PVL$_{47\ mol\ \%}$) a) and b) before degradation c) and d) after degradation.

Figures 7A, 7B:
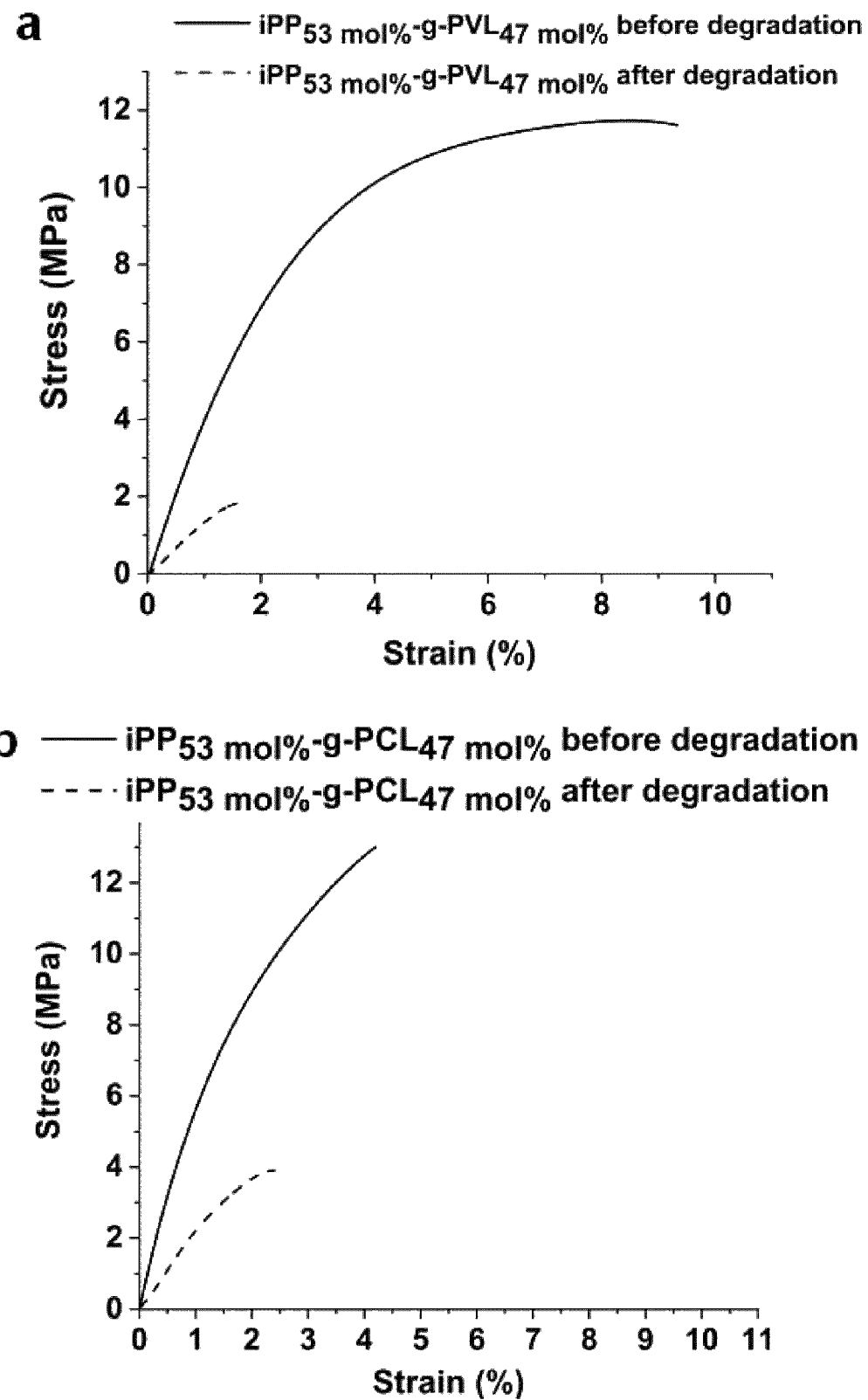

FIG. 7: Stress-strain curves of the tensile testing of a) iPP-g-PVL copolymer (iPP$_{53\ mol\ \%}$-g-PVL$_{47\ mol\ \%}$) before (solid line) and after degradation of PVL (dash line) and b) iPP-g-PCL copolymer (iPP$_{53\ mol\ \%}$-g-PCL$_{47\ mol\ \%}$) before (solid line) and after degradation of PCL (dash line).

Figures 8A, 8B:
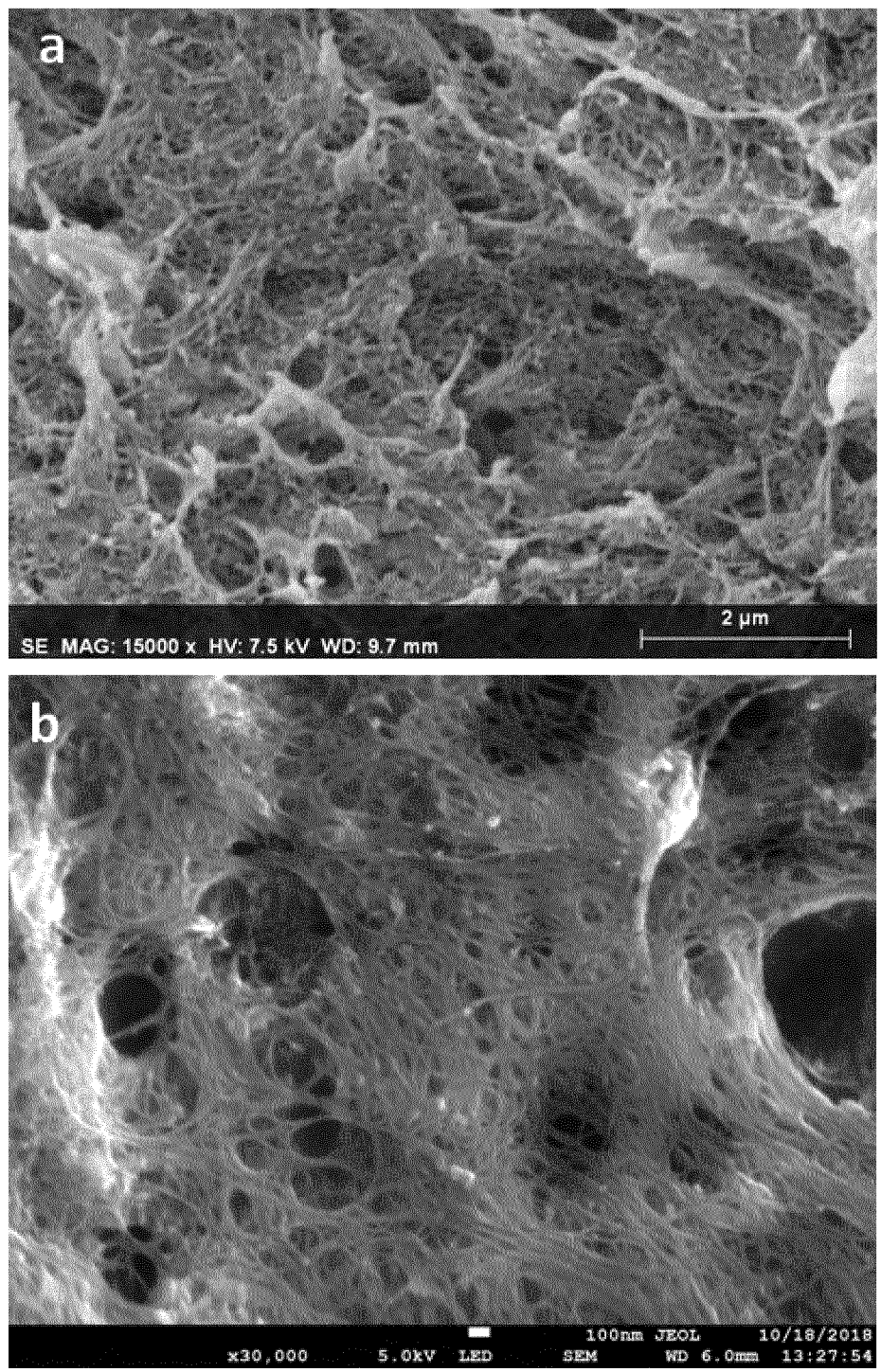

FIG. 8: FE-SEM of the porous membranes from a) iPP-g-PVL copolymer (iPP$_{53\ mol\ \%}$-g-PVL$_{47\ mol\ \%}$) after degradation; b) iPP-g-PCL copolymer (iPP$_{53\ mol\ \%}$-g-PCL$_{47\ mol\ \%}$) after degradation.

Figures 9A, 9B:
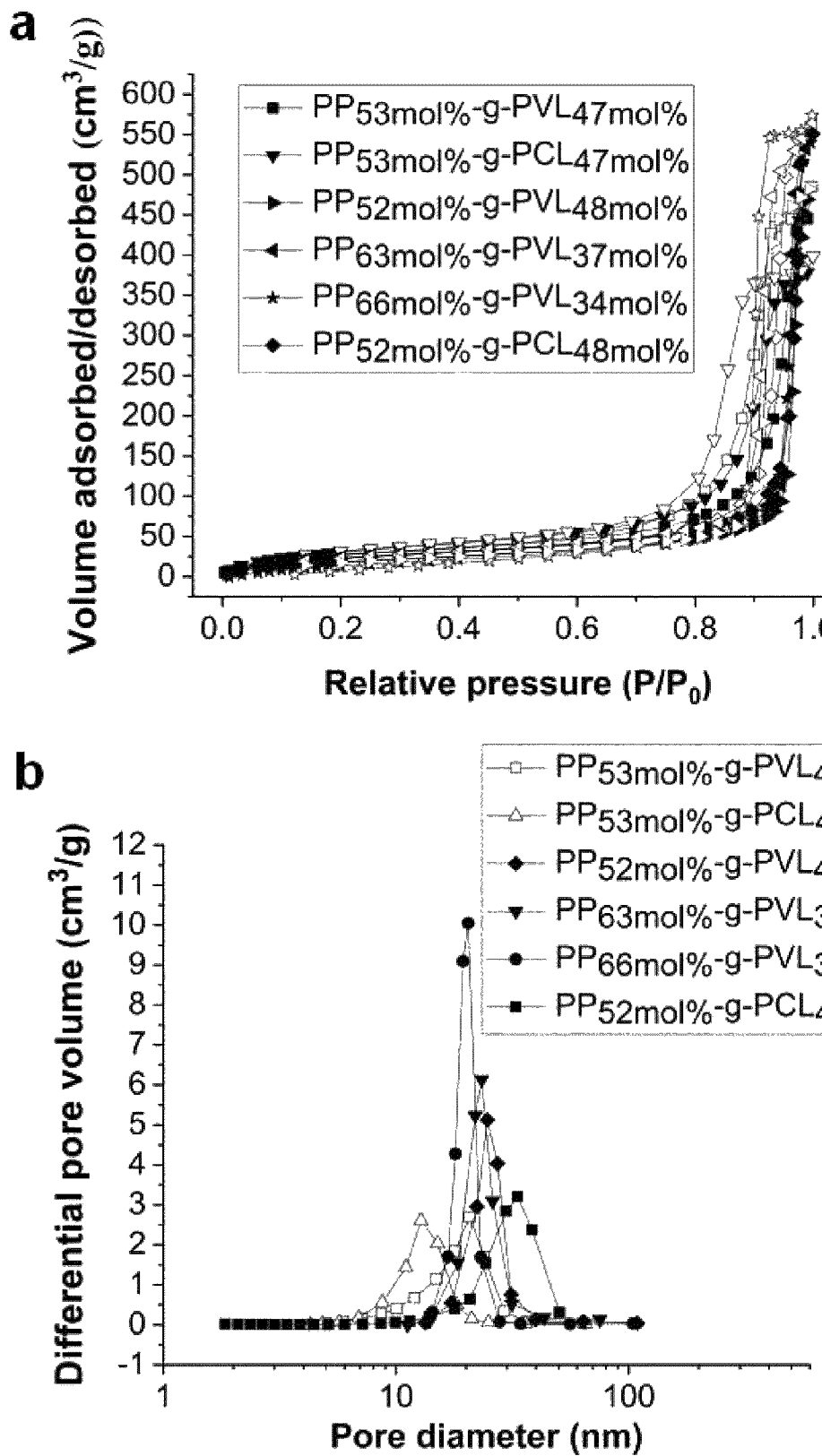

FIG. 9: a) Nitrogen adsorption measurements on porous membranes measured at T=77K showing the adsorption (filled squares) and desorption (empty squares) isotherms; b) Pore size distribution for the porous membranes after PVL or PCL degradation calculated from nitrogen adsorption (filled squares) and desorption (empty squares) isotherms.

Figure 10:
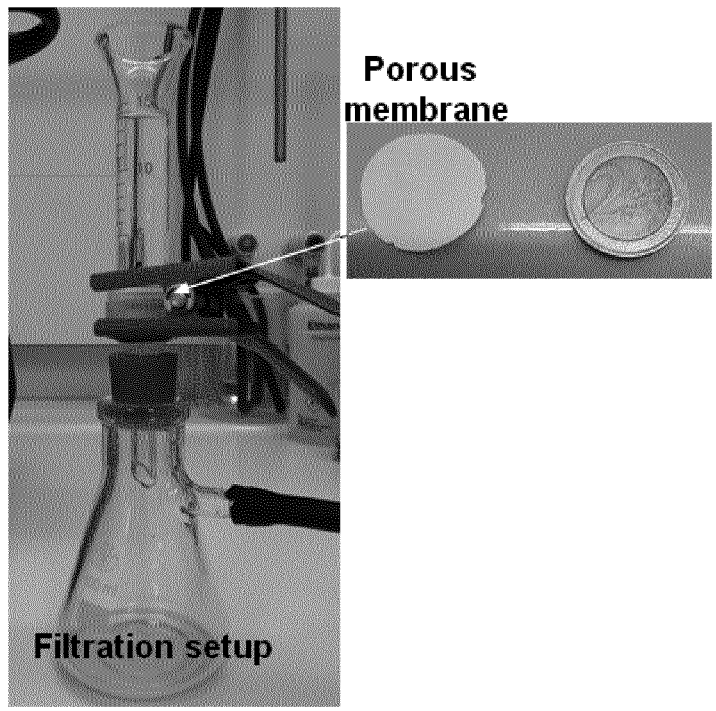

FIG. 10: Filtration setup.

Figure 11:
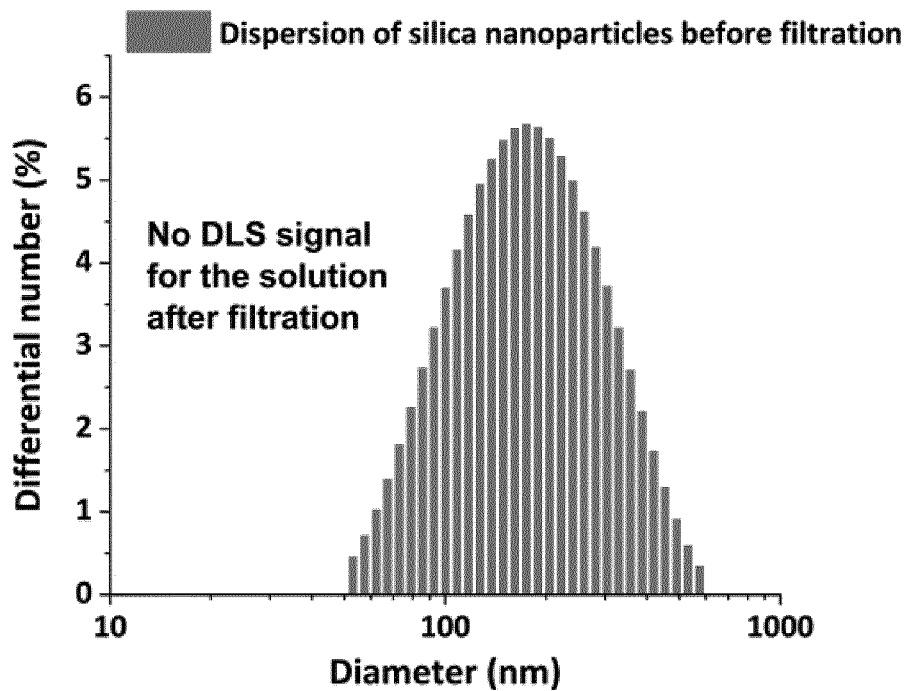

FIG. 11: DLS of the silica nanoparticles dispersion before and after filtration.

FIGS. 12: 3D simulation representation of embodiments: 12a, 12e and 12f are comparative examples, which are not within the scoop of the invention; 12b, 12c and 12d are embodiments within the scoop of the invention.

REFERENCES

[1] (a) Baker, R. W. Membrane Technology and Applications, Wiley, West Sussex, 2004. (b) Nunes, S. P.; Car, A. *Ind. Eng. Chem.* 2013, 52, 993-1003.

[2] (a) Bierenbaum, H. S.; Isaacson, R. B.; Druin, M. L.; Plovan, S. G. *Ind. Eng. Chem. Proc. Res. Dev.* 1974, 13, 2-8. (b) Chen, R. T.; Saw, C. K.; Jamieson, M. G.; Aversa, T. R.; Callahan, R. W. *J. Appl. Polym. Sci.* 1994, 53, 471-483.

[3] (a) Fleisher, R. L.; Alter, H. W.; Furman, S. C.; Price, P. B.; Walker, R. M. *Science* 1972, 172, 225-263. (b) Awasthi, K.; Kulshrestha, V.; Acharya, N. K.; Singh, M.; Vijay, Y. K. *Eur. Polym. J.* 2006, 42, 883-887.

[4] (a) Ichikawa, T.; Takahara, K.; Shimoda, K.; Seita, Y.; Emi, M. U.S. Pat. No. 4,708,800; Terumo Kabushiki Kaisha, 1987. (b) Chau, C. C.; Im, J.-h. U.S. Pat. No. 4,874,568; The DOW Chemical Company, 1989. (c) Lopatin, G.; Yen, L. Y.; Rogers, R. R. U.S. Pat. No. 4,874,567; Milipore Corporation, 1989.

[5] For example see: (a) Zhang, Y.; Sargent, J. L.; Boudouris, B. W.; Phillip, W. A. *J. Appl. Polym. Sci.* 2015, DOI: 10.1002/APP.41683. (b) Nunes, S. P. *Macromolecules* 2016, 49, 2905-2916.

[6] (a) Smith, D. R.; Meier, D. J. *Polymer* 1992, 33, 3777-3782. (b) Ndoni, S.; Vigild, M. E.; Berg, R. H. *J. Am. Chem. Soc.* 2003, 125, 13366-13367. (c) Zalusky, A. S.; Olayo-Valles, R.; Wolf, J. H.; Hillmyer, M. A. *J. Am. Chem. Soc.* 2002, 124, 12761-12773.

[7] (a) Ring, J. O.; Thomann, R.; Müllhaupt, R.; Raquez, J.-M.; Degée, P.; Dubois, P. *Macromol. Chem. Phys.* 2007, 208, 896-302. (b) Pitet, L. M.; Amendt, M. A.; Hillmyer, M. A. *J. Am. Chem. Soc.* 2010, 132, 8230-8231. (c) Hillmyer, M.; Pitet, L.; Amendt, M. (University of Minnesota) U.S. Pat. No. 9,051,421 B2, 2015. (d) Kato, T.; Hillmyer, M. A. *ACS Appl. Mater. Interfaces* 2013, 5, 291-300. (e) Pillai, S. K. T.; Kretschmer, W. P.; Trebbin, M.; Försrster, S.; Kempe, R. *Chem. Eur. J.* 2012, 18, 13974-13978.

[8] The only example reported so far consist of nonporous poly(vinylidene fluoride)-graft-poly(meth)acrylate graft copolymers. For example see: Hester, J. F.; Banerjee, P.; Won, Y.-Y.; Akthakul, A.; Acar, M. H.; Mayes, A. M. *Macromolecules* 2002, 35, 7652-7661.

[9] Wolf, J. H.; Hillmyer, M. A. *Langmuir* 2003, 19, 6553-6560.
[10] Brunauer, S.; Deming, L. S.; Deming, W. E.; Teller, E. J. *J. Am. Chem. Soc.* 1940, 62, 1723-1732.
[11] Barrett, E. P.; Joyner, L. G.; Halenda, P. P. *J. Am. Chem. Soc.* 1951, 73, 373-380.

Experimental Section.

Measurement Methods

Materials. δ-Valerolactone (VL; 98%, TCI) ε-caprolactone (CL; 97%, Sigma-Aldrich) were dried over CaH$_2$ (95%, Sigma-Aldrich) and distilled under reduced pressure. Diethyl ether was used as received. Toluene (anhydrous, Sigma-Aldrich) was purified using an MBraun-SPS-800 purification column system and were kept in glass bottle with 4-Å molecular sieves under an inert atmosphere. 10-undecen-1-ol was purchased from Sigma-Aldrich and dried with 4-A molecular sieves under an inert atmosphere. Methylaluminoxane (MAO) (30 wt. % solution in toluene) was purchased from Chemtura. Diethyl zinc (DEZ) (1.0 M solution in hexanes), triisobutylaluminium (TiBA) (1.0 M solution in hexanes). rac-Me$_2$Si(2-Me-4-Ph-Ind)$_2$ZrCl$_2$ was purchased from MCAT GmbH, Konstanz, Germany. Isotactic polypropylene (i-PP) (SABIC—PP520P, MFR=10.5 g/10 min (230° C./2.16 kg), tin(II) 2-ethylhexanoate (Sn(Oct)$_2$) (92-100%, Sigma-Aldrich), titanium (IV) n-butoxide (Ti(OBu)$_4$, Sigma Aldrich), Irganox 1010 (antioxidant, BASF) were used as received.

Synthesis of isotactic poly(propylene-co-10-undecen-1-ol) (i PP-OH). The copolymerisation reaction was carried out in a stainless steel Buchi reactor (300 mL). Prior to the polymerisation, the reactor was dried in vacuo and flushed with nitrogen. Toluene (100 mL) was introduced into the reactor followed by TiBA (1.0 M solution in hexanes, 5 mL) and the functionalised comonomer (10-undecen-1-ol; 1 mL, 2.5 mmol) under a nitrogen atmosphere. The resulting solution was stirred for 15-20 min. Subsequently MAO (30 wt. % solution in toluene, 2.0 mL) was introduced into the reactor under nitrogen atmosphere. The solution was saturated with propylene (5 bar). In a glovebox, a stock solution of rac-Me$_2$Si(2-Me-4-Ph-Ind)$_2$ZrCl$_2$ (5 mg, 8 μmol) in toluene (10 mL) was prepared and the catalyst solution (5 mL) was transferred into the reactor under an nitrogen atmosphere. The propylene pressure was maintained constant for 30 min. At the end of the reaction, the propylene feed was stopped and the residual propylene was released from the reactor. The resulting mixture was quenched in acidified methanol (300 mL, 2.5 wt. % of concentrated HCl), filtered and washed with demineralised water. The obtained powder was dried in a vacuum oven under reduced pressure at 60° C. overnight.

Typical polymerisation procedure of PP-craft-PCL via catalytic ring-opening polymerisation. iPP-OH (4 g, M$_n$=27.8 kDa, Đ$_M$=2.3) was placed in a round bottom flask with a magnetic stirrer and dried by Dean-Stark distillation in toluene (100 mL) for 24 h. Than the solution was cooled down to 100° C. and catalyst Sn(Oct)$_2$ (180 mg), ε-caprolactone (10.3 g, 89.9 mmol) were added. The reaction was carried out for 24 h under inert atmosphere. The progress of the copolymerisation was followed by $^1$H NMR spectroscopy by taking aliquots at set time intervals. The synthesised copolymer was isolated by the precipitation in diethyl ether and dried in a vacuum oven at 40° C. for 24 h.

Typical polymerisation procedure of PP-graft-PVL via catalytic ring-opening polymerisation. iPP-OH (4 g, M$_n$=27.8 kDa, Đ$_M$=2.3) was placed in a round bottom flask with a magnetic stirrer and dried by Dean-Stark distillation in toluene (100 mL) for 24 h. Than the solution was cooled down to 100° C. and catalyst Sn(Oct)$_2$ (180 mg), δ-valerolactone (10.0 g, 100 mmol) were added. The reaction was carried out for 24 h under inert atmosphere. The progress of the copolymerisation was followed by $^1$H NMR spectroscopy by taking aliquots at set time intervals. The synthesized copolymer was isolated by the precipitation in diethyl ether and dried in a vacuum oven at 40° C. for 24 h.

Typical procedure for the synthesis of PP-graft-PCL copolymers via transesterification reaction. iPP-OH (4 g, M$_n$=27.8 kDa, DM=2.3) and PCL (6 g, M$_n$=42.0 kDa, DM=2.7) with antioxidant Irganox 1010 (2500 ppm) were premixed for 5 minutes and fed into a co-rotating twin-screw mini-extruder at 190° C. with a screw rotation rate set at 100 rpm. After this time tin (II) 2-ethylhexanoate (0.09 g, 0.22 mmol) as catalyst was added and the mixture was stirred for an additional 5 minutes. Afterwards the extruder chamber was cooled and evacuated.

Compression-molding experiments. All the films were prepared via compression-molding using PP ISO settings on LabEcon 600 high-temperature press (Fontijne Presses, the Netherlands). The copolymers were introduced into a Teflon mould to prepare the samples with the thickness of 0.18 mm. The program of compression molding consisted of following steps: heating to 200° C. for 5 min at 5 bar and cooling to room temperature for 10 min at 5 bar.

Membrane Formation:

The degradation of the polyester sequence of the copolymers was carried out by immersing pieces of the copolymer films in a 0.5 M solution of NaOH in a mix a water and methanol (60:40). The solution was kept at 70° C. during 3 days and the porous membranes were then washed with slightly acidic MeOH (aq) and then pure MeOH and dried for 24 h under vacuum.

Filtration Procedure:

The volumetric flux of the membrane was determined by the following procedure. The porous membrane was clamped on a glass filter device, then vacuum was applied (20 mbar) and water was added at the top of the filtration device.

The volumetric flux was calculated using the Equation 1 and was equal to 75 L·m$^{-2}$·h$^{-1}$.

$$J_V = \frac{V}{A*t} \qquad \text{Equation 1: Volumetric flux}$$

Where $J_V$ is the volumetric flux, V is the volume (L), A is the area of the membrane (m$^2$) and t is the time (h).

Then, a filtration experiment was carried out using a dispersion of silica nanoparticles 3% (w/v) in ethanol (size of the particles lower than 100 nm). The dispersion was filtered using the same filtration setup and DLS experiments were carried out on the solutions before and after filtration. After filtration, no signal were measured by DLS, proving that the silica nanoparticles were stopped by the porous membrane.

Characterisation.

$^1$H NMR: carried out at 90° C. using deuterated tetrachloroethane (TCE-d$_2$) as the solvent and recorded in 5 mm tubes on a Bruker spectrometer operating at frequencies of 300 MHz. Chemical shifts in ppm versus TCE-d$_2$ were determined by reference to the residual solvent signal.

HT-SEC: M$_n$, M$_w$ and the polydispersity index (PDI, Đ$_M$) were determined by size exclusion chromatography: SEC measurements were performed at 150° C. on a Polymer Char GPC-IR® built around an Agilent GC oven model 7890, equipped with an autosampler and the Integrated Detector IR4. 1,2-dichlorobenzene (o-DCB) was used as an eluent at a flow rate of 1 mL/min. The SEC-data were processed using Calculations Software GPC One®.

DSC: Melting ($T_m$) and crystallisation ($T_c$) temperatures as well as enthalpies of the transitions were measured by differential scanning calorimetry (DSC) using a DSC Q100 from TA Instruments. The measurements were carried out at a heating and cooling rate of 10° C.·min$^{-1}$ from −60° C. to 230° C. The transitions were deduced from the second heating and cooling curves.

Field Emission Scanning Electron Microscopy (FE-SEM) imaging. The cross-section morphology of the degraded self-assembled copolymer film was characterised by FE-SEM imaging (JEOL JSM 7800-F) at an operation voltage of 5 kV using LED detector. To obtain an adequate contrast of the membrane nano-pore morphology and to avoid destroying of the cross-sections of the membrane film, the samples for FE-SEM imaging were first immersed in liquid nitrogen, fractured and then sputtered with Platinum/palladium (Pt/Pd).

Atomic Force Microscopy (AFM) Analysis.

Sample preparation: For spin-coated self-assembled copolymer film, AFM imaging was directly performed on the film surface at ambient conditions without further treatment of the sample. For imaging the cross-section of the film before and after degradation, the samples were cut into proper specimens and subsequently cryo-microtomed at −120° C. using microtoming equipment (LEICA EM UC7). A diamond knife (Diatome) mounted in a stainless steel holder was used for microtoming of the samples. Such cross-sectioned segments were used for AFM measurements without further treatment.

AFM analysis: AFM imaging was performed at Dimension FastScan AFM system from Bruker utilising tapping mode AFM tips (Model TESPA-V2, k: 42 N/m, f: 320 kHz). The software Nanoscope Analysis 1.5 from Bruker was used as the computer interface for operation and analysis of AFM measurements. All AFM measurements were performed at ambient conditions. Height and phase images were recorded simultaneously at a scan rate of 1 Hz with a resolution of 512×512 pixels. Optical imaging integrated in the AFM setup was first used before AFM measurement to select the area of interest for imaging. Pore-size analysis: The nitrogen adsorption-desorption isotherms were measured at −196° C. using a Micromeritics ASAP 2420 analyser. The samples were degassed overnight at 30° C. under high vacuum (133 Pa) prior to measurements. The specific surface area of the membranes was calculated using the Brunauer-Emmet-Teller method,[10] while the pore-size distribution was determined using the Barret-Joyner-Halenda model.[11]

Dynamic mechanical thermal analysis: DMTA was performed using a TA Instruments Q800 DMA. Samples were tested by strain controlled temperature ramp with the frequency of 1 Hz. The temperature profile was from ~100° C. until the melting point of the polyolefin segment with the ramp 3° C./min. The glass transition temperature was calculated as the peak of the tangent delta signal.

Mechanical properties analysis: Mechanical properties were characterised by performing tensile test experiments in triplicate, using a microtensile tester (Linkam, TST 350). Both ends of the tensile specimen (length: 30 mm, width: 2 mm, thickness: 0.18 mm) were gripped by jaws which were 15 mm apart. A load cell with a capacity of 200 N was used to measure the applied force. The tensile tests were carried out at a constant speed of 50 pm/s at room temperature.

TABLE 1

Composition (volume and molar fraction) of the copolymers (determined by $^1$H NMR).

| | Propylene unit (mol %) | lactone unit (mol %)$^a$ | f(PP) (volume fraction) | f(Polyester) (volume fraction) | #OH/ chain |
|---|---|---|---|---|---|
| iPP$_{52\ mol\ \%}$-g-PVL$_{48\ mol\ \%}$ | 52 | 48 | 0.35 | 0.65 | 3 |
| iPP$_{53\ mol\ \%}$-g-PVL$_{47\ mol\ \%}$ | 53 | 47 | 0.36 | 0.64 | 6 |
| iPP$_{56\ mol\ \%}$-g-PVL$_{44\ mol\ \%}$ | 56 | 44 | 0.39 | 0.61 | 6 |
| iPP$_{63\ mol\ \%}$-g-PVL$_{37\ mol\ \%}$ | 63 | 37 | 0.46 | 0.54 | 3 |
| iPP$_{66\ mol\ \%}$-g-PVL$_{34\ mol\ \%}$ | 66 | 34 | 0.50 | 0.50 | 3 |
| iPP$_{76\ mol\ \%}$-g-PVL$_{24\ mol\ \%}$ | 76 | 24 | 0.62 | 0.38 | 6 |
| iPP$_{52\ mol\ \%}$-g-PCL$_{48\ mol\ \%}$ | 52 | 48 | 0.33 | 0.67 | 3 |
| iPP$_{53\ mol\ \%}$-g-PCL$_{47\ mol\ \%}$ | 53 | 47 | 0.33 | 0.67 | 6 |
| iPP$_{71\ mol\ \%}$-g-PCL$_{29\ mol\ \%}$ | 71 | 29 | 0.52 | 0.48 | 6 |
| iPP$_{73\ mol\ \%}$-g-PCL$_{27\ mol\ \%}$ | 73 | 27 | 0.55 | 0.45 | 3 |

$^a$valerolactone unit for PVL and caprolactone unit for PCL.

TABLE 2

Characterisation of the copolymer by $^1$H NMR and SEC.

| | $M_n^a$ [kDa] | $M_w^a$ [kDa] | $Đ_M$ (SEC)$^a$ | OH mol %$^b$ | OH/ chain$^b$ | Mn of polyester per grafted chain$^c$ |
|---|---|---|---|---|---|---|
| i-poly(propylene-co-undecenol) | 27.8 | 63.3 | 2.3 | 0.9 | 6 | N.A. |
| PP$_{53\ mol\ \%}$-g-PVL$_{47\ mol\ \%}$ | 22.9 | 71.0 | 3.1 | N.A. | 6 | 9.9 |
| PP$_{56\ mol\ \%}$-g-PVL$_{44\ mol\ \%}$ | 21.8 | 69.3 | 3.2 | N.A. | 6 | 8.8 |
| iPP$_{76\ mol\ \%}$-g-PVL$_{24\ mol\ \%}$ | 25.2 | 73.4 | 2.9 | N.A. | 6 | 4.9 |
| PP$_{53\ mol\ \%}$-g-PCL$_{47\ mol\ \%}$ | 20.3 | 100.5 | 5.0 | N.A. | 6 | 11.6 |
| iPP$_{71\ mol\ \%}$-g-PCL$_{29\ mol\ \%}$ | 20.4 | 89.3 | 4.4 | N.A. | 6 | 5.0 |
| i-poly(propylene-co-undecenol) | 22.9 | 58.6 | 2.6 | 0.5 | 3 | N.A. |
| PP$_{52\ mol\ \%}$-g-PVL$_{48\ mol\ \%}$ | 14.6 | 60.5 | 4.1 | N.A. | 3 | 17.2 |
| PP$_{63\ mol\ \%}$-g-PVL$_{37\ mol\ \%}$ | 22.5 | 66.2 | 2.9 | N.A. | 3 | 10.4 |
| PP$_{66\ mol\ \%}$-g-PVL$_{34\ mol\ \%}$ | 23.2 | 67.3 | 2.9 | N.A. | 3 | 9.5 |
| PP$_{52\ mol\ \%}$-g-PCL$_{48\ mol\ \%}$ | 31.2 | 119.1 | 3.8 | N.A. | 3 | 19.4 |
| iPP$_{73\ mol\ \%}$-g-PCL$_{27\ mol\ \%}$ | 20.6 | 85.7 | 4.2 | N.A. | 3 | 8.4 |

$^a$Molar mass (kDa) and polydispersity index ($Đ_M$) were measured by HT-SEC in o-DCB at 150° C. (using PS standard and Mark-Houwink parameters).
$^b$Amount of pending OH groups per chain was determined by $^1$H NMR.
$^c$Molar mass of PVL was determined by $^1$H NMR.

TABLE 3

Thermal properties.

| | $T_c$ (° C.)[a] | | $T_m$ (° C.)[a] | |
|---|---|---|---|---|
| | PVL or PCL | PP | PVL or PCL | PP |
| i-poly(propylene-co-undecenol) | N.A. | 105.7 | N.A. | 142.3 |
| PP$_{53\ mol\ \%}$-g-PVL$_{47\ mol\ \%}$ | 10.1 | 109.7 | 51.7 | 143.9 |
| PP$_{56\ mol\ \%}$-g-PVL$_{44\ mol\ \%}$ | 6.9 | 107.0 | 46.0 | 141.9 |
| PP$_{53\ mol\ \%}$-g-PCL$_{47\ mol\ \%}$ | 18.0 | 105.1 | 48.9 | 141.3 |
| i-poly(propylene-co-undecenol) | N.A. | 110.2 | N.A. | 147.2 |
| PP$_{52\ mol\ \%}$-g-PVL$_{48\ mol\ \%}$ | 26.1 | 110.9 | 50.8 | 148.7 |
| PP$_{63\ mol\ \%}$-g-PVL$_{37\ mol\ \%}$ | 13.3 | 112.9 | 48.4 | 148.1 |
| PP$_{66\ mol\ \%}$-g-PVL$_{34\ mol\ \%}$ | 8.9 | 112.5 | 47.3 | 148.3 |
| PP$_{52\ mol\ \%}$-g-PCL$_{48\ mol\ \%}$ | 20.0 | 113.2 | 47.5 | 148.2 |

[a] $T_c$ and $T_m$ were determined by DSC.

TABLE 4

Mechanical properties.

| | Young's modulus (MPa)[a] | Tensile toughness (J/m³)[a] | OH/chain[b] |
|---|---|---|---|
| PP$_{53\ mol\ \%}$-g-PCL$_{47\ mol\ \%}$ | 660 | 35.1 | 6 |
| PP$_{53\ mol\ \%}$-g-PVL$_{47\ mol\ \%}$ | 415 | 85.3 | 6 |
| PP$_{56\ mol\ \%}$-g-PVL$_{44\ mol\ \%}$ | 740 | 21.3 | 6 |
| PP$_{53\ mol\ \%}$-g-PCL$_{47\ mol\ \%}$ after degradation | 225 | 5.6 | 6 |
| PP$_{53\ mol\ \%}$-g-PVL$_{47\ mol\ \%}$ after degradation | 145 | 1.9 | 6 |
| PP$_{56\ mol\ \%}$-g-PVL$_{44\ mol\ \%}$ after degradation | 186 | 2.6 | 6 |
| PP$_{52\ mol\ \%}$-g-PCL$_{48\ mol\ \%}$ | 733 | 6930[b] | 3 |
| PP$_{52\ mol\ \%}$-g-PVL$_{48\ mol\ \%}$ | 780 | 4.7 | 3 |
| PP$_{63\ mol\ \%}$-g-PVL$_{37\ mol\ \%}$ | 787 | 32.1 | 3 |
| PP$_{66\ mol\ \%}$-g-PVL$_{34\ mol\ \%}$ | 670 | 11.71 | 3 |
| PP$_{52\ mol\ \%}$-g-PCL$_{48\ mol\ \%}$ after degradation | 120 | 0.6 | 3 |
| PP$_{52\ mol\ \%}$-g-PVL$_{48\ mol\ \%}$ after degradation | 106 | 0.7 | 3 |
| PP$_{63\ mol\ \%}$-g-PVL$_{37\ mol\ \%}$ after degradation | 115 | 0.4 | 3 |
| PP$_{66\ mol\ \%}$-g-PVL$_{34\ mol\ \%}$ after degradation | 180 | 1.43 | 3 |

[a] Young's moduli and tensile toughness were determined by tensile experiments.
[b] Very ductile material, deformed to the maximum (500%) of the tensile machine without breaking.

TABLE 5

Porosity characterisation.

| | pore size distribution adsorption[a] (nm) | pore size distribution desorption[a] (nm) | Surface area[b] (m²/g) |
|---|---|---|---|
| PP$_{53\ mol\ \%}$-g-PVL$_{47\ mol\ \%}$ | 41.0 | 21.0 | 105 |
| PP$_{56\ mol\ \%}$-g-PVL$_{44\ mol\ \%}$ | 40.6 | 18.4 | 62 |
| PP$_{53\ mol\ \%}$-g-PCL$_{47\ mol\ \%}$ | 22.0 | 12.8 | 121 |
| PP$_{52\ mol\ \%}$-g-PVL$_{48\ mol\ \%}$ | 60.7 | 24.7 | 76 |
| PP$_{63\ mol\ \%}$-g-PVL$_{37\ mol\ \%}$ | 52.2 | 23.4 | 93 |
| PP$_{66\ mol\ \%}$-g-PVL$_{34\ mol\ \%}$ | 36 | 20.4 | 73 |
| PP$_{52\ mol\ \%}$-g-PCL$_{48\ mol\ \%}$ | 63.6-76 | 33.3 | 90 |

[a] Pore size distribution determined by Barret-Joyner-Halenda model.
[b] Surface area determined by Brunauer-Emmet-Teller method.

The invention claimed is:

1. A film comprising a random graft copolymer having a polypropylene (PP) backbone and from 3 to 8 polyester segments covalently bonded to said PP backbone,
   wherein the number average molecular weight, Mn, of the PP backbone ranges between 10 and 100 kDa,
   wherein the $M_n$ of each polyester segment ranges between 5 and 25 kDa,
   wherein the amount of PP ranges between 45 and 80 mol %,
   wherein the amount of polyester segments ranges between 55 and 20 mol %,
   wherein the film has a thickness in the range of 0.01-10 mm,
   wherein the PP and polyester domains form gyroid bicontinuous morphology,
   wherein the mol % is calculated relative to the total moles of monomer units present in the copolymer
   wherein the polyester segments are self-arranged in domains suitable to form porous channel through the film after a segment sacrifice process.

2. The film according to claim 1, wherein the PP backbone is prepared from a PP-homopolymer or from a copolymer of propylene and ethylene, wherein the amount of ethylene is less than 5 wt %.

3. The film according to claim 1, wherein the PP in the backbone of the copolymer has a melting temperature of at least 120° C.

4. The film according to claim 1, wherein the film has a Young's modulus between 300 and 1500 MPa and the toughness of the film ranges between 1 and 150 J/m³.

5. The film according to claim 1, wherein the polyester segment comprises monomer units derived from caprolactone and/or valerolactone.

6. The film according to claim 1, wherein the amount of PP ranges between 50-75 mol %, while the amount of polyester is between 50-25 mol %.

7. A nanoporous membrane, comprising at least 90 wt % of PP,
   wherein the PP comprises —OX functional groups randomly distributed on the polymer chain,
   wherein the amount of functional groups ranges between 3 and 8 per polymer chain, as determined with ¹H NMR and
   wherein X is chosen from Mg, Zn, Al, H, Li, Na or K.

8. The membrane according to claim 7, wherein the PP in the membrane has an $M_n$ between 10 and 100 kDa, and is isotactic or syndiotactic.

9. The membrane according to claim 7, wherein the membrane has a thickness between 0.01 and 10 mm,
   wherein the membrane has pores having a size between 10-50 nm as measured with $N_2$-desorption according to Barret-Joyner-Halenda model and a BET surface area between 50-200 m²/g determined by the Brunauer-Emmet-Teller method.

10. The membrane according to claim 7, wherein the membrane has a melt temperature, $T_m$ between 120° C. and 160° C. as measured with DSC.

11. The membrane according to claim 7, wherein the membrane has a Young's modulus between 50 and 400 MPa and the membrane has a toughness between 0.1 and 15 J/m³.

12. An article comprising the film according to claim 1, wherein the film is a water filter or battery separator.

13. A water filter system comprising the nanoporous membrane as defined in claim 7.

14. A battery comprising the nanoporous membrane as defined in claim 7.

15. A PP membrane unit, which is a multilayer membrane or multi membranes, in which the layers or the membranes are
   the nanoporous membrane according to claim 7,
   a microporous PP membrane and/or a PP non-woven material.

16. The nanoporous membrane of claim 7, wherein the polymer chain is a homopolymer of propylene, or a copolymer of ethylene and propylene, wherein the amount of ethylene is less than 5 wt %.

* * * * *